(12) United States Patent
Ji et al.

(10) Patent No.: US 10,712,497 B2
(45) Date of Patent: *Jul. 14, 2020

(54) PHOTONIC INTEGRATED CIRCUIT PACKAGES AND METHODS OF MANUFACTURING THE SAME

(71) Applicant: Samsung Electronics Co., Ltd., Suwon-si, Gyeonggi-do (KR)

(72) Inventors: Ho Chul Ji, Seongnam-si (KR); Kwan Sik Cho, Hwaseong-si (KR); Keun Yeong Cho, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,763

(22) Filed: Nov. 7, 2018

(65) Prior Publication Data

US 2019/0265408 A1 Aug. 29, 2019

Related U.S. Application Data

(60) Provisional application No. 62/635,819, filed on Feb. 27, 2018.

(30) Foreign Application Priority Data

Jun. 4, 2018 (KR) .......................... 10-2018-0064070

(51) Int. Cl.
*G02B 6/12* (2006.01)
(52) U.S. Cl.
CPC ............. *G02B 6/12004* (2013.01); *G02B 2006/12061* (2013.01); *G02B 2006/12104* (2013.01); *G02B 2006/12107* (2013.01)

(58) Field of Classification Search
None
See application file for complete search history.

(56) References Cited

U.S. PATENT DOCUMENTS

| | | |
|---|---|---|
| 9,285,554 B2 | 3/2016 | Doany et al. |
| 9,791,641 B2 | 10/2017 | Heck et al. |
| 2004/0021214 A1* | 2/2004 | Badehi ............. G02B 6/10 257/690 |
| 2007/0013017 A1* | 1/2007 | Badehi ............. G02B 6/3897 257/432 |
| 2011/0129181 A1 | 6/2011 | Bolle |

(Continued)

FOREIGN PATENT DOCUMENTS

JP 2006-003818 1/2006

*Primary Examiner* — Chad H Smith
(74) *Attorney, Agent, or Firm* — Myers Bigel, P.A.

(57) ABSTRACT

Photonic integrated circuit packages having improved integration, and methods of manufacturing such photonic integrated circuit packages, are provided. As an example, a photonic integrated circuit package may include a substrate, a first insulating layer on the substrate, a photonic core layer on the first insulating layer, and a second insulating layer on the photonic core layer. A photonic coupling device may be in the photonic core layer, and may be, as examples, at least one of a grating coupler or a photodetector. A concave mirror may extend into at least the second insulating layer. In some embodiments, the concave mirror may extend through the second insulating layer and into the first insulating layer.

19 Claims, 16 Drawing Sheets

(56) References Cited

U.S. PATENT DOCUMENTS

| | | | |
|---|---|---|---|
| 2013/0214674 A1* | 8/2013 | Inoguchi | H01L 24/97 |
| | | | 313/498 |
| 2013/0313668 A1 | 11/2013 | Spencer et al. | |
| 2014/0252411 A1 | 9/2014 | Kang et al. | |
| 2015/0270898 A1 | 9/2015 | Mekis et al. | |
| 2017/0102503 A1* | 4/2017 | Israel | G02B 6/262 |
| 2017/0207600 A1* | 7/2017 | Klamkin | H01S 5/02292 |
| 2018/0045891 A1 | 2/2018 | Israel et al. | |
| 2019/0265421 A1* | 8/2019 | Ji | G02B 6/4214 |

\* cited by examiner

PHOTONIC INTEGRATED CIRCUIT PACKAGES AND METHODS OF MANUFACTURING THE SAME

CROSS-REFERENCE TO RELATED APPLICATIONS

This U.S. Non-Provisional application claims priority under 35 USC § 119 to U.S. Provisional Application No. 62/635,819 filed on Feb. 27, 2018 in the United States Patent and Trademark Office (USPTO) and to Korean Patent Application No. 10-2018-0064070 filed on Jun. 4, 2018 in the Korean Intellectual Property Office (KIPO), the disclosures of which are incorporated by reference herein in their entireties.

TECHNICAL FIELD

The present disclosure relates to photonic integrated circuit packages and to methods of manufacturing the same.

BACKGROUND

Demand for high-speed transmission and reception of large amounts of data in electronic devices is increasing. Accordingly, some research has been undertaken into the partial or complete replacement of signal transmission methods which utilize signals transmitted through metal wirings with signal transmission methods which utilize a photonic signal. In signal transmission methods that utilize a photonic signal, it may be desirable to have photonic integrated circuit packages in which photonic signal transmission components are arranged. Efficient arrangements for the accurate transmission of light between components in such photonic integrated circuit packages, are desirable.

SUMMARY

Some aspects of the inventive concepts disclosed herein provide a photonic integrated circuit package having improved integration and a method of manufacturing the same.

According to some aspects of the present inventive concepts, a photonic integrated circuit package may include a substrate, a first insulating layer on the substrate, a photonic core layer on the first insulating layer, and a second insulating layer on the photonic core layer. A photonic coupling device may be in the photonic core layer. A concave mirror may extend into at least the second insulating layer.

According to some aspects of the present inventive concepts, a photonic integrated circuit package may include a photonic integrated circuit substrate that includes an insulating layer and a photonic core layer. A photonic coupling device may be included in the photonic core layer, and a reflective unit may extend into the photonic integrated circuit substrate from one surface of the photonic integrated circuit substrate. The reflective unit may be spaced apart laterally from the photonic coupling device.

According to some aspects of the present inventive concepts, a photonic integrated circuit package may include a photonic integrated circuit substrate including a base substrate, a first insulating layer, a photonic core layer, and a second insulating layer, stacked sequentially. A photonic coupling device may be included in the photonic core layer. The photonic integrated circuit package may include an electric-optical device that is on the photonic integrated circuit substrate, and a concave mirror that extends into at least the second insulating layer from an upper surface of the photonic integrated circuit substrate.

According to some aspects of the present inventive concepts, a method of manufacturing a photonic integrated circuit package may include preparing a stacked structure of a base substrate, and a first insulating layer and a photonic core layer sequentially stacked on the base substrate. The photonic core layer may include a semiconductor material. The method may further include forming photonic devices including a photonic coupling device in the photonic core layer, forming a photonic integrated circuit substrate by forming a second insulating layer on the photonic core layer, forming a recessed region by removing a portion of the second insulating layer in a region spaced apart laterally from the photonic coupling device, forming a wiring layer electrically connected to at least one of the photonic devices, on the photonic core layer, and forming a reflective unit by forming a reflective layer in the recessed region.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, some examples of embodiments of the present inventive concepts will be described with reference to the accompanying drawings.

Figure 1:
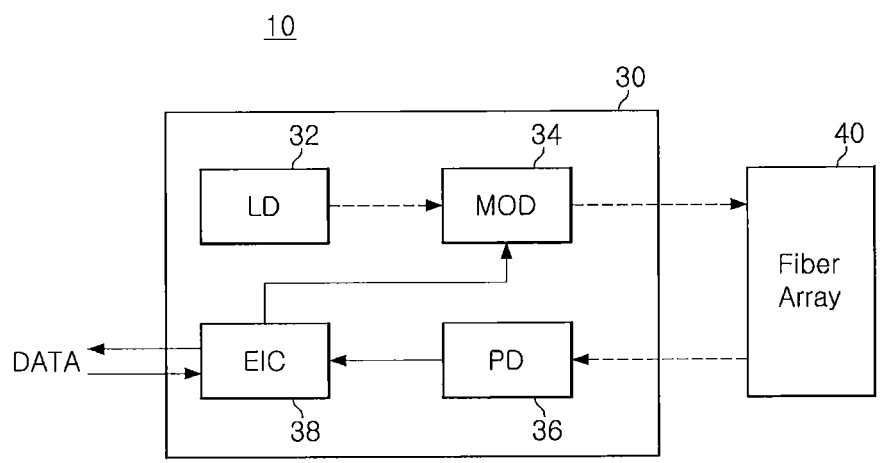
FIG. 1 is a schematic block diagram of a photonic integrated circuit package according to some examples of embodiments.

FIG. 1 is a schematic block diagram of a photonic integrated circuit package according to some examples of embodiments.

Referring to FIG. 1, a photonic integrated circuit package 10 may be a photonic signal transmission/reception device, and may include a photonic integrated circuit 30 and a photonic fiber array 40. In the photonic integrated circuit package 10, the photonic integrated circuit 30 may convert a photonic signal into an electrical signal, or may convert an electrical signal into a photonic signal. The photonic signal may be output or input through the photonic fiber array 40.

The photonic integrated circuit 30 may include photonic devices, and in detail, may include a laser diode (LD) 32, a photonic modulator 34, and a photodetector 36. The photonic integrated circuit 30 may further include an electrical integrated circuit device 38. The photonic integrated circuit 30 may further include an active photonic device such as a wavelength division multiplexing (WDM) device, and/or passive photonic devices such as a photonic waveguide, a grating coupler, a reflector, or the like.

The laser diode 32 may be an example of a light source that is configured to generate light, and may be replaced with various types of electric-optical conversion devices such as a light emitting diode (LED), according to some examples of embodiments.

The photonic modulator 34 may be configured to modulate a photonic signal received from the laser diode 32, and may be, for example, an electro-absorption modulator or an interferometric modulator. For example, the photonic modulator 34 may be a Mach-Zehnder interferometric modulator in which light is separated into two or more paths, a phase of the light is modulated in at least one of the paths, and light is modulated using cancellation and constructive interference between the phase-modulated light and light which is not phase-modulated (e.g., phase-maintained light).

The photodetector 36 may be an optical-electric conversion device configured to convert a photonic signal into an electrical signal. The photodetector 36 may output the electrical signal generated by converting the photonic signal and may transmit the generated electrical signal to the electrical integrated circuit device 38.

The electrical integrated circuit device 38 may receive data DATA from an external device and may transmit the electrical signal to the photonic modulator 34, based on the received data DATA. The electrical integrated circuit device 38 may also receive an electrical signal obtained by converting a photonic signal from the photodetector 36, and may output the electrical signal to an external device.

The photonic fiber array 40 may include at least one photonic fiber. The photonic fiber array 40 may be photonically connected to the photonic devices in the photonic integrated circuit 30.

A photonic signal transmission process in the photonic integrated circuit package 10 may proceed as follows. The photonic signal generated in the laser diode 32 may be transmitted to the photonic modulator 34 through the photonic waveguide, and may be externally transmitted through the photonic fiber array 40. On the other hand, a photonic signal externally received through the photonic fiber array 40 may be transmitted to the photodetector 36, and the received signal may be converted into an electrical signal by the photodetector 36 and may be externally transmitted through the electrical integrated circuit device 38.

The photonic integrated circuit 30, and the laser diode 32, the photonic modulator 34, the photodetector 36 and the electrical integrated circuit device 38 thereof, may be arranged on one substrate (e.g., a common substrate), but the present disclosure is not limited thereto. For example, the laser diode 32 and/or the electrical integrated circuit device 38 may be on a substrate different from a substrate for other components. According to some examples of embodiments, a photonic transmitter including the laser diode 32 and a photonic receiver including the photodetector 36 may be separated to form respective photonic integrated circuits. The photonic fiber array 40 may be arranged or combined on one surface or one side of the photonic integrated circuit 30.

Figure 2:
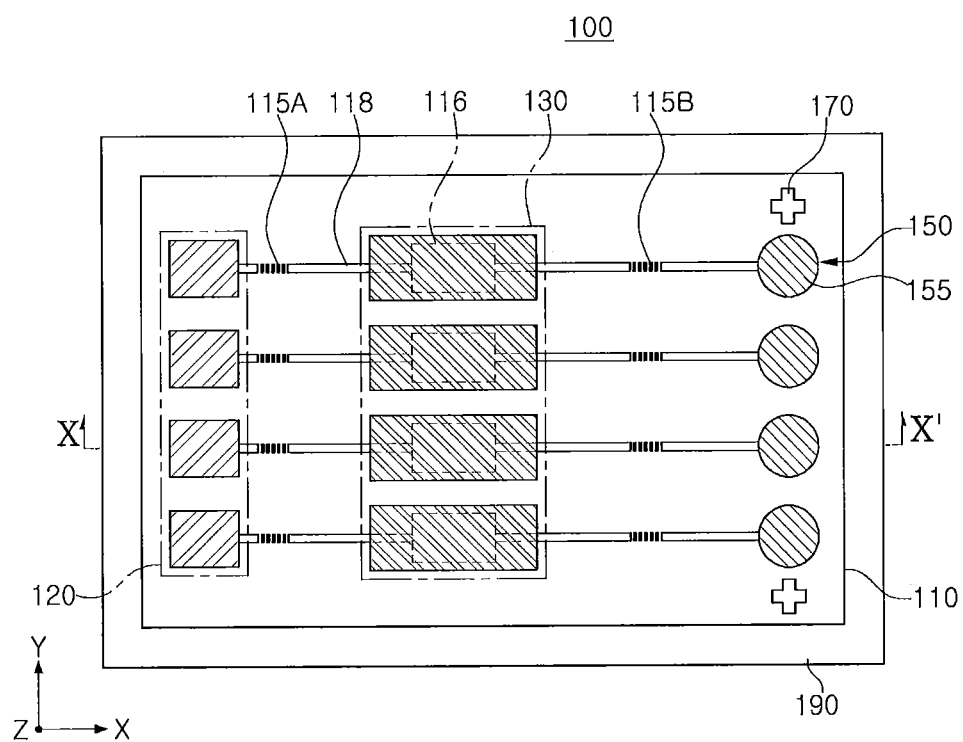
FIG. 2 is a schematic plan view of a photonic integrated circuit package according to some examples of embodiments.

FIG. 2 is a schematic plan view of a photonic integrated circuit package according to some examples of embodiments.

Figure 3:
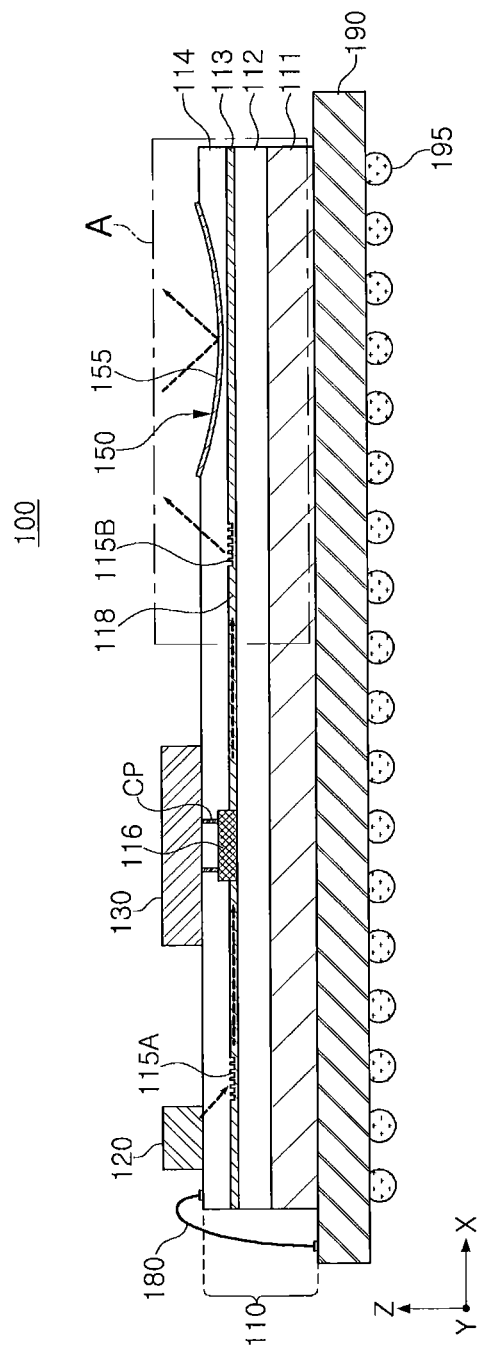
FIG. 3 is a schematic cross-sectional view of a photonic integrated circuit package according to some examples of embodiments, and is a cross-section taken along line X-X' of FIG. 2.

FIG. 3 is a schematic cross-sectional view of a photonic integrated circuit package according to some examples of embodiments. FIG. 3 is a cross section taken along line X-X' of FIG. 2.

Figure 4:
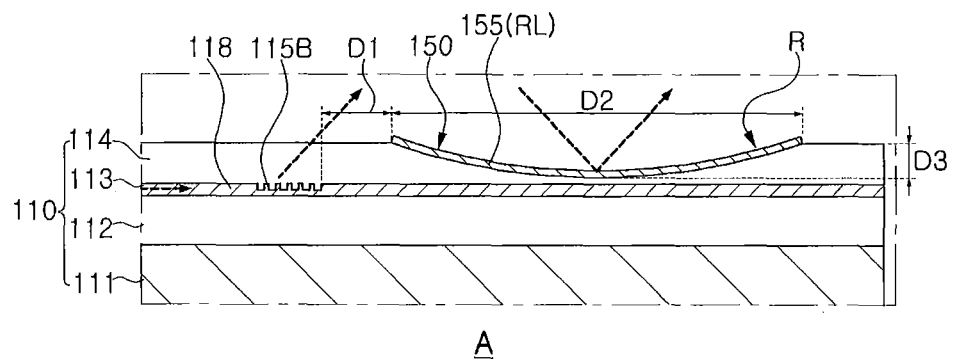
FIG. 4 is a partially enlarged view of a photonic integrated circuit package according to some examples of embodiments, and is an enlarged view of region A of FIG. 3.

FIG. 4 is a partially enlarged view of a photonic integrated circuit package according to some examples of embodiments, and is an enlarged view of region A of FIG. 3.

Referring to FIGS. 2 and 3, a photonic integrated circuit package 100 may include a photonic integrated circuit substrate 110, a light source 120, an electrical integrated circuit device 130, and a reflective unit 150. In the photonic integrated circuit package 100, the photonic integrated circuit substrate 110 may be mounted on a package substrate 190, and the light source 120 and the electrical integrated circuit device 130 may be mounted on the photonic integrated circuit substrate 110. The photonic integrated circuit package 100 may further include an alignment mark 170 located on at least a portion of the photonic integrated circuit substrate 110 and connection terminals 195 on a lower surface of the package substrate 190.

The photonic integrated circuit substrate 110 may include a base substrate 111, a first insulating layer 112, a photonic core layer 113 in which photonic devices are disposed, and a second insulating layer 114, stacked sequentially. The photonic integrated circuit substrate 110 may be electrically connected to the package substrate 190 through a wire 180, and may exchange electrical signals.

The base substrate 111 and the photonic core layer 113 may include a semiconductor material, such as a Group IV semiconductor material, such as silicon, germanium or silicon-germanium. The base substrate 111 may be provided as a bulk wafer or an epitaxial layer, and the photonic core layer 113 may also be provided as an epitaxial layer. The first and second insulating layers 112 and 114 may be formed of an insulating material, for example, silicon oxide. In detail, the second insulating layer 114 may be formed of a material having a lower refractive index than that of the photonic core layer 113. In some examples of embodiments, the base substrate 111, the first insulating layer 112, and the photonic core layer 113 may constitute a silicon-on-insulator (SOI) substrate.

The photonic core layer 113 may be provided with various photonic devices including photonic coupling devices. In detail, the photonic waveguide 118, first and second grating couplers 115A and 115B, and a photonic modulator 116, may be included in the photonic core layer 113. The first and second grating couplers 115A and 115B and the photonic modulator 116 may be connected to one another by the photonic waveguide 118. The first and second grating couplers 115A and 115B may be used for input and output of light, respectively. The first and second grating couplers 115A and 115B may enable horizontally-traveling light in the photonic integrated circuit substrate 110 to be coupled in a vertical direction toward an upper portion or in a direction tilted from the vertical direction by a predetermined angle.

Thus, in detail, the first and second grating couplers 115A and 115B may be referred to herein as a photonic coupling device in conjunction with the photodetector 160 (see FIG. 13) to be described below. The photonic modulator 116 may be between the first and second grating couplers 115A and 115B, and may generate a photonic signal by changing intensity, a phase, and the like of light. The photonic waveguide 118 may be between the first and second grating couplers 115A and 115B and the photonic modulator 116 to connect the first and second grating couplers 115A and 115B and the photonic modulator 116, and may be a passage through which light travels. According to some examples of embodiments, an optical-electric conversion device such as a photodetector may be included in the photonic core layer 113 in a region not illustrated.

The light source 120 may be mounted on an upper surface of the photonic integrated circuit substrate 110, and may transmit light toward the photonic core layer 113, in detail, the first grating coupler 115A. The light source 120 may be an electric-optical conversion device, for example, a laser diode or a light emitting diode. According to some examples of embodiments, the light source 120 may not be mounted on the photonic integrated circuit substrate 110, but may be on an upper structure.

The electrical integrated circuit device 130 may be mounted on the upper surface of the photonic integrated circuit substrate 110, and may transmit an electrical signal to the photonic modulator 116 and/or a photodetector.

The reflective unit 150 may reflect the photonic signal transmitted from above, back to the upper part thereof. Thus, a photonic structure including a reflector may be coupled to an upper portion of the reflective unit 150. The photonic structure may be, for example, a photonic interface including a photonic fiber, such as the photonic fiber array 40 of FIG. 1. Coupling methods of the photonic structure may be various according to some examples of embodiments. For example, the photonic structure may be directly coupled to the upper surface of the photonic integrated circuit substrate 110, may be coupled to an upper portion to be spaced apart from the upper surface of the photonic integrated circuit substrate 110, or may be on a side of the photonic integrated circuit substrate 110. The photonic structure may include a reflector, to transmit the photonic signal having been transmitted upwardly of the second grating coupler 115B, back to the reflective unit 150. The reflective unit 150 may reflect the photonic signal again to transfer the signal to the photonic structure.

Referring to FIG. 4, the reflective unit 150 may be in a recessed region R of the second insulating layer 114, and may be a concave mirror. The reflective unit 150 may include a metal layer 155 as a reflective layer RL on a recessed surface of the second insulating layer 114. The reflective unit 150 may thus extend into the second insulating layer 114. The metal layer 155 may include a metal having high reflectance characteristics, and may include, for example, at least one of aluminum (Al), copper (Cu), gold (Au), or silver (Ag).

The reflective unit 150 may be laterally spaced apart by a first distance D1 from photonic coupling devices that are included in the photonic core layer 113 such as, for example, the second grating coupler 115B. The first distance D1 may be, for example, several micrometers to several tens of micrometers. The photonic coupling device may not be in a portion of the photonic core layer 113 below the reflective unit 150. The photonic coupling device and the reflective unit 150 may not vertically overlap. In some examples of embodiments, photonic devices other than the photonic coupling device may be in a portion of the photonic core layer 113 below the reflective unit 150. In some examples of embodiments, the portion of the photonic core layer 113 below the reflective unit 150 may be provided as a dummy photonic core layer. A diameter D2 of the reflective unit 150 may be within a range of, for example, 50 μm to 200 μm. A depth D3 of the reflective unit 150, as measured from the upper surface of the photonic integrated circuit substrate 110, may be several micrometers to several tens of micrometers, and may be changed depending on a thickness of the second insulating layer 114, a curvature of the reflective unit 150, or the like. Various structures of the reflective unit 150 will be described below with reference to FIGS. 5 to 8.

The alignment mark 170 may be on a portion of the upper surface of the photonic integrated circuit substrate 110, as illustrated in FIG. 2. The alignment mark 170 may be a mark for alignment of the photonic structure and the photonic integrated circuit substrate 110 when the photonic structure described above is coupled. For example, by defining a position with a coordinate value represented by the distance from a center of the reflective unit 150 using the alignment mark 170, the photonic structure and the photonic integrated circuit substrate 110 may be aligned.

The package substrate 190 may be mounted on a board-level device through conductive connection terminals 195 on a lower surface of the package substrate 190, and may be electrically connected to an external device.

As illustrated via arrows in FIG. 3, a photonic signal generated in the light source 120 may be transmitted to the photonic core layer 113 in the photonic integrated circuit substrate 110. The first grating coupler 115A may receive the photonic signal from the light source 120, and may transmit the received photonic signal through the photonic waveguide 118 in a horizontal direction, for example, in an X direction, to the photonic modulator 116. The photonic modulator 116 may receive an electrical signal from the electrical integrated circuit device 130, may modulate the photonic signal, based on the electrical signal. The generated photonic signal may be externally output through the reflective unit 150 and the photonic structure such as a photonic interface.

As illustrated in FIG. 2, in some examples of embodiments, a plurality of light sources 120 (which may be referred to collectively herein as light source 120) emitting light of different wavelengths may be provided and a plurality of photonic modulators 116 and a plurality of electrical integrated circuit devices 130 may also be provided, and arranged in an array form. Ones of the photonic modulators 116 and the electrical integrated circuit devices 130 may be configured to change the intensity, phase and the like of light from respective ones of the light sources 120. A plurality of reflective units 150 (which may be referred to collectively herein as reflective unit 150) may also be provided to correspond to the respective light sources 120.

The plurality of photonic signals generated by the plurality of photonic modulators 116 receiving from the plurality of light sources 120, respectively, may transmit different pieces of data and information. The photonic structure may include a plurality of photonic fibers, and the photonic signals may be output through the plurality of photonic fibers without interference and overlapping with each other. The number and arrangement of the light sources 120, the photonic modulators 116, the electrical integrated circuit devices 130, and the reflective units 150 may be variously modified according to some examples of embodiments.

Figure 5:
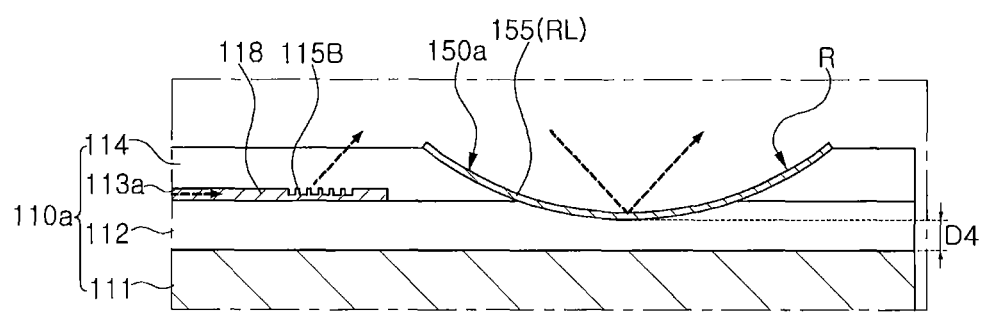
FIG. 5 is a cross-sectional view illustrating a portion of a photonic integrated circuit package according to some examples of embodiments.

FIG. 5 is a cross-sectional view illustrating a portion of a photonic integrated circuit package according to some examples of embodiments, and illustrates a region corresponding to FIG. 4.

Referring to FIG. 5, a reflective unit 150a may be in a recessed region R of a photonic integrated circuit substrate 110a, in which the reflective unit 150a extends through the first insulating layer 112 and into a recessed portion of the second insulating layer 114. In some embodiments, a photonic core layer 113a may not extend toward a lower portion of the reflective unit 150a, and instead may only extend to a region that is spaced apart from the reflective unit 150a. The present disclosure is not limited thereto. According to some examples of embodiments, a portion of the photonic core layer 113a may extend to a lower portion of the reflective unit 150a, such that at least portions of the photonic core layer 113a and the reflective unit 150a are vertically overlapping.

A thickness D4 of the first insulating layer 112 below the reflective unit 150a may be greater than zero. A central portion of the reflective unit 150a may be positioned on the same vertical level as, or on a higher vertical level than, an upper surface of a base substrate 111. For example, at the deepest point of the reflective unit 150a, as measured from the upper surface of the second insulating layer 114, the reflective unit 150a may be in contact with the base substrate 111.

Figure 6A:
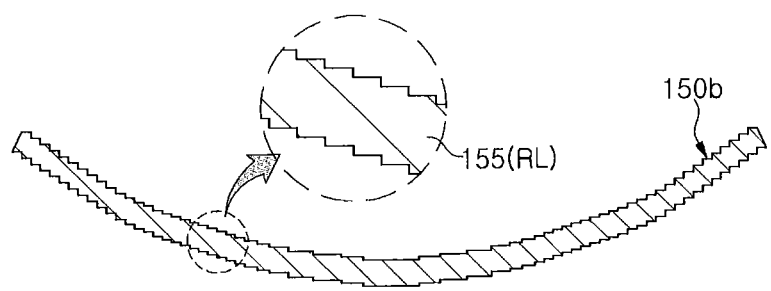
FIGS. 6A to 6C are cross-sectional views illustrating reflective units of photonic integrated circuit packages according to some examples of embodiments.
Figure 6B:
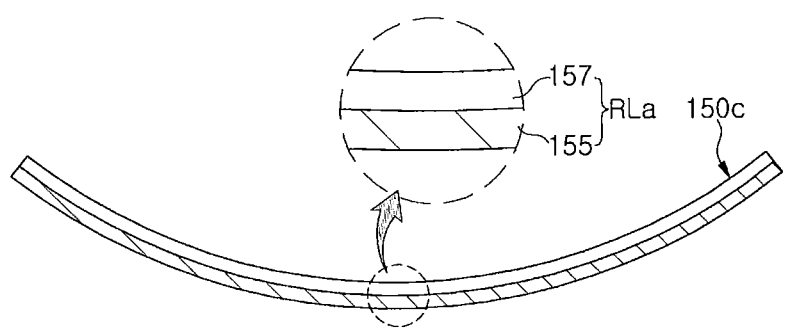
Figure 6C:
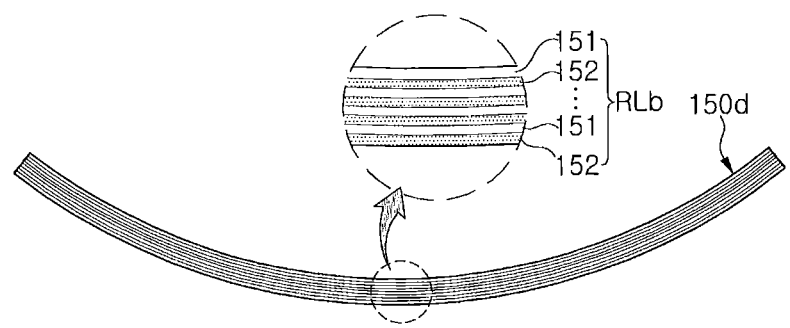

FIGS. 6A to 6C are cross-sectional views of reflective units of photonic integrated circuit packages, according to some examples of embodiments.

Referring to FIG. 6A, a reflective unit 150b may have fine steps having a stepped shape on a surface thereof.

As illustrated in FIG. 6A, the reflective unit 150b may have steps on an upper surface and a lower surface thereof. The steps may have the same or different depths and angles on the upper and lower surfaces of the reflective unit 150b. The steps may be formed by forming a mask layer using a grayscale lithography method and and etching a photonic integrated circuit substrate 110 as illustrated in FIG. 4 using the mask layer to form the recessed region R with the steps on the surface thereof, and by forming a metal layer 155 on the recessed region R to be deposited thereon along the steps.

Referring to FIG. 6B, a reflective unit 150c may include a metal layer 155 and a dielectric layer 157 on the metal layer 155, as a reflective layer RLa.

The dielectric layer 157 may be a layer that prevents or reduces oxidation of the metal layer 155 and that protects the metal layer 155. The dielectric layer 157 may include a dielectric material having relatively low photonic loss with respect to light of a wavelength band to be reflected. The dielectric layer 157 may include, for example, silicon oxide ($SiO_2$), silicon nitride ($Si_3N_4$), silicon oxynitride (SiON), a high-k dielectric material, or combinations thereof.

Referring to FIG. 6C, a reflective unit 150d may include first and second Bragg layers 151 and 152 alternately stacked as a reflective layer RLb and having different refractive indices.

The first and second Bragg layers 151 and 152 may form a distributed Bragg reflector (DBR). For example, the first Bragg layer 151 may include a low or lower refractive index layer and the second Bragg layer 152 may include a high or higher refractive index layer. The first and second Bragg layers 151 and 152 may be formed of a dielectric material. The first Bragg layer 151 may include at least one of, for example, $SiO_2$ (refractive index: about 1.46), $Al_2O_3$ (refractive index: about 1.68), or MgO (refractive index: about 1.7), and the second Bragg layer 152 may include at least one of, for example, $TiO_2$ (refractive index: about 2.3), $Ta_2O_5$ (refractive index: about 1.8), ITO (refractive index: about 2.0), $ZrO_2$ (refractive index: about 2.05), or $Si_3N_4$ (refractive index: about 2.02). The first and second Bragg layers 151 and 152 may have the same or different thicknesses.

Figure 7:
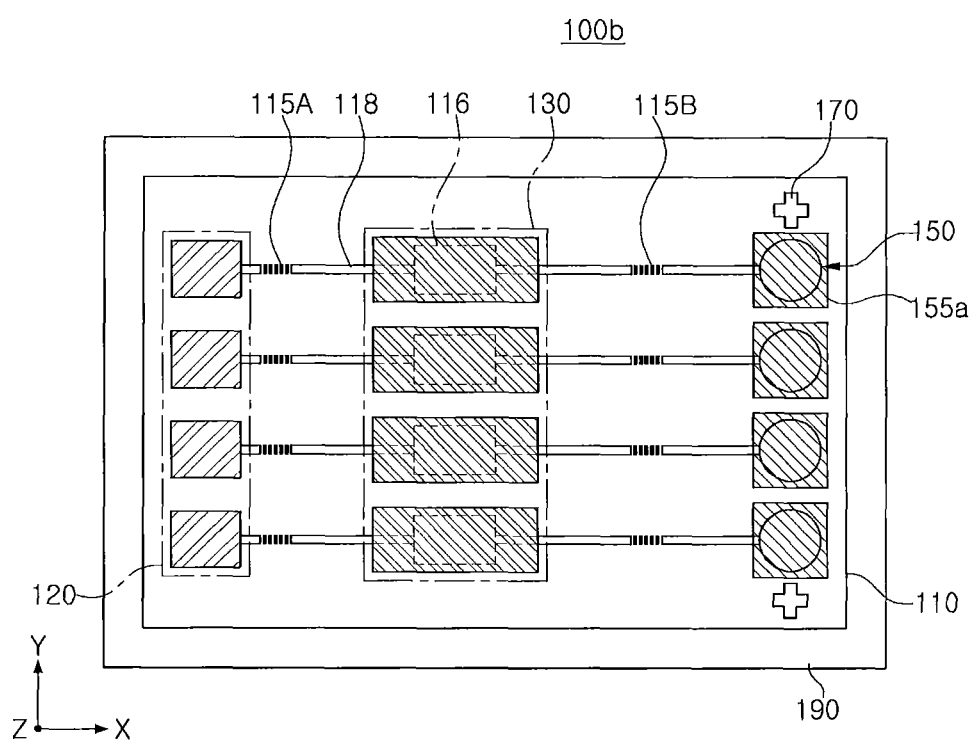
FIGS. 7 and 8 are schematic plan views of photonic integrated circuit packages according to some examples of embodiments.
Figure 8:
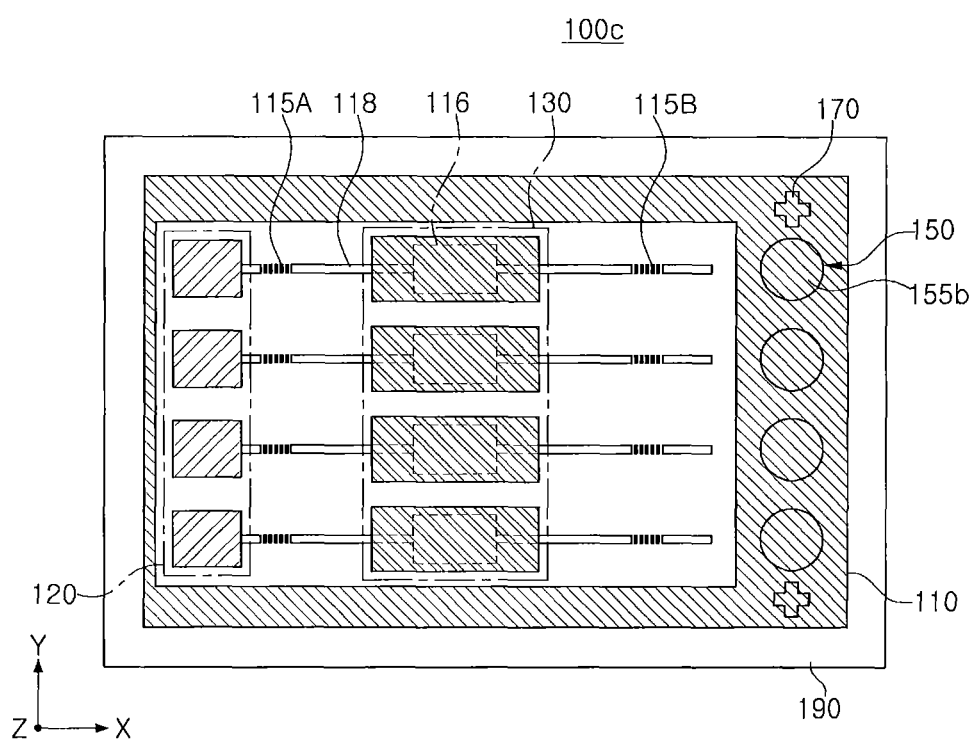

FIGS. 7 and 8 are schematic plan views of a photonic integrated circuit package according to some examples of embodiments.

Referring to FIG. 7, in a photonic integrated circuit package 100b, a reflective layer 155a constituting a reflective unit 150 may have a region greater than that of the reflective unit 150. For example, the reflective layer 155a may extend outwardly from the recessed region R of FIG. 4, and may surround the reflective unit 150 having a concave mirror form. In some examples of embodiments, the reflective layer 155a may extend beyond an outer edge of the concave mirror, and may extend in a plane parallel to an upper surface of the second insulating layer 114. The reflective layer 155a, or portions thereof, may have a quadrilateral shape on a plane as illustrated in FIG. 7, but the present disclosure is not limited thereto.

Referring to FIG. 8, in a photonic integrated circuit package 100c, a reflective layer 155b constituting a reflective unit 150 may have a wider region than that of the reflective unit 150. The reflective layer 155b may be in a region other than a region in which photonic devices are arranged, on a plane. In detail, the reflective layer 155b may not cover photonic coupling devices such as first and second grating couplers 115A and 115B. In some examples of embodiments, the reflective layer 155b may extend into a region or regions provided that transmission of a photonic signal is not disturbed. For example, the reflective layer 155b may extend into a region other than a region providing a photonic path, and the region in which the reflective layer 155b is formed may be variously varied.

FIGS. 9 to 12 are cross-sectional views illustrating a portion of a photonic integrated circuit package according to some examples of embodiments.

Figure 9:
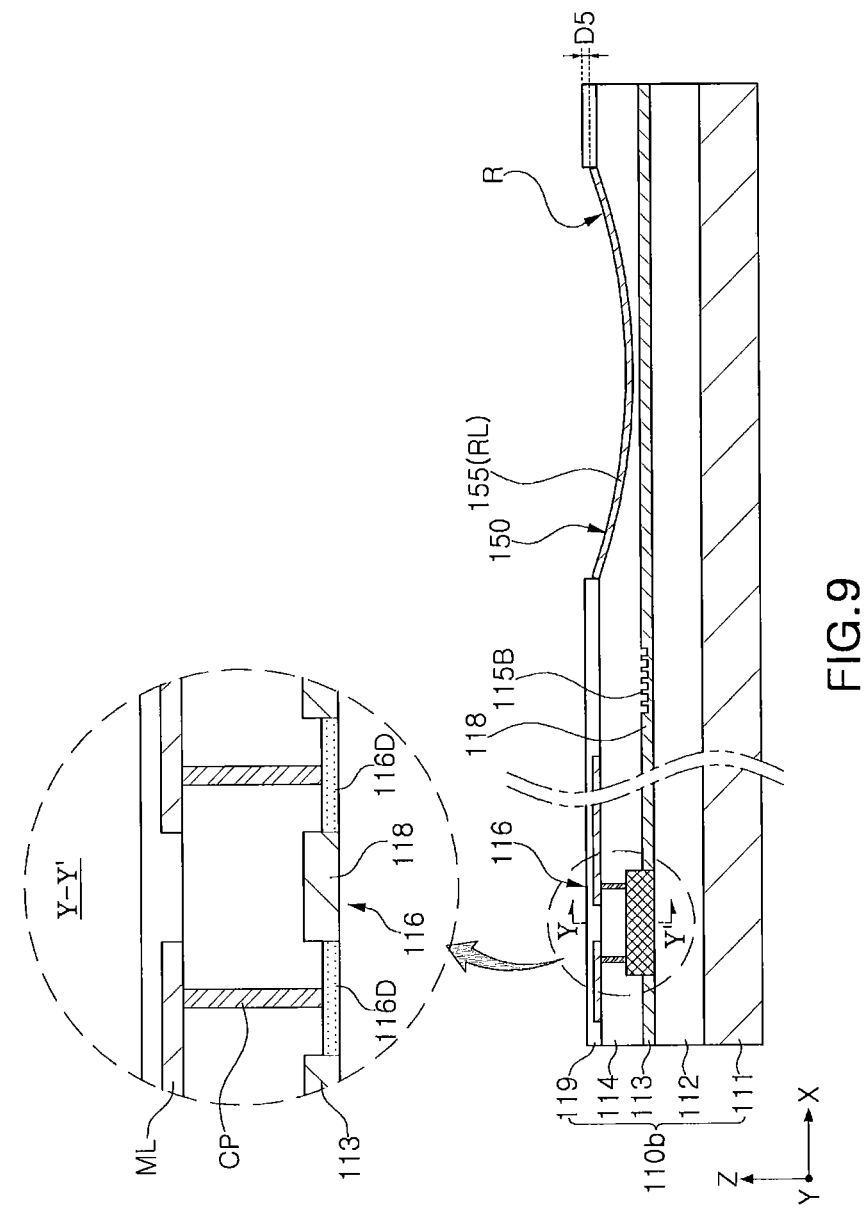
FIGS. 9 to 12 are cross-sectional views illustrating portions of photonic integrated circuit packages according to some examples of embodiments.

FIG. 9 illustrates that a photonic modulator 116, a second grating coupler 115B, a photonic waveguide 118, and a reflective unit 150 may be provided in a photonic integrated circuit substrate 110b. As illustrated in an enlarged view taken along line Y-Y' in a vertical direction in FIG. 9, the photonic modulator 116 may include two impurity regions 116D on both sides of the photonic waveguide 118 or a photonic signal transmission region extending from the photonic waveguide 118, in a photonic core layer 113, the two impurity regions 116D having different conductivity-type impurities. The photonic integrated circuit substrate 110b may further include contact plugs CP on the impurity regions 116D to be connected thereto, and wiring layers ML on the contact plugs CP.

A metal layer 155 as a reflective layer RL, constituting the reflective unit 150, may have a portion located on the same level as the wiring layers ML. For example, a height of the metal layer 155 in an edge region may be substantially the same or similar to that of the wiring layers ML. According to some examples of embodiments, the metal layer 155 may have the same thickness as that of the wiring layers ML in at least one region. Such a structure may be obtained by forming the wiring layers ML and the metal layer 155 together in the same process.

Figure 10:
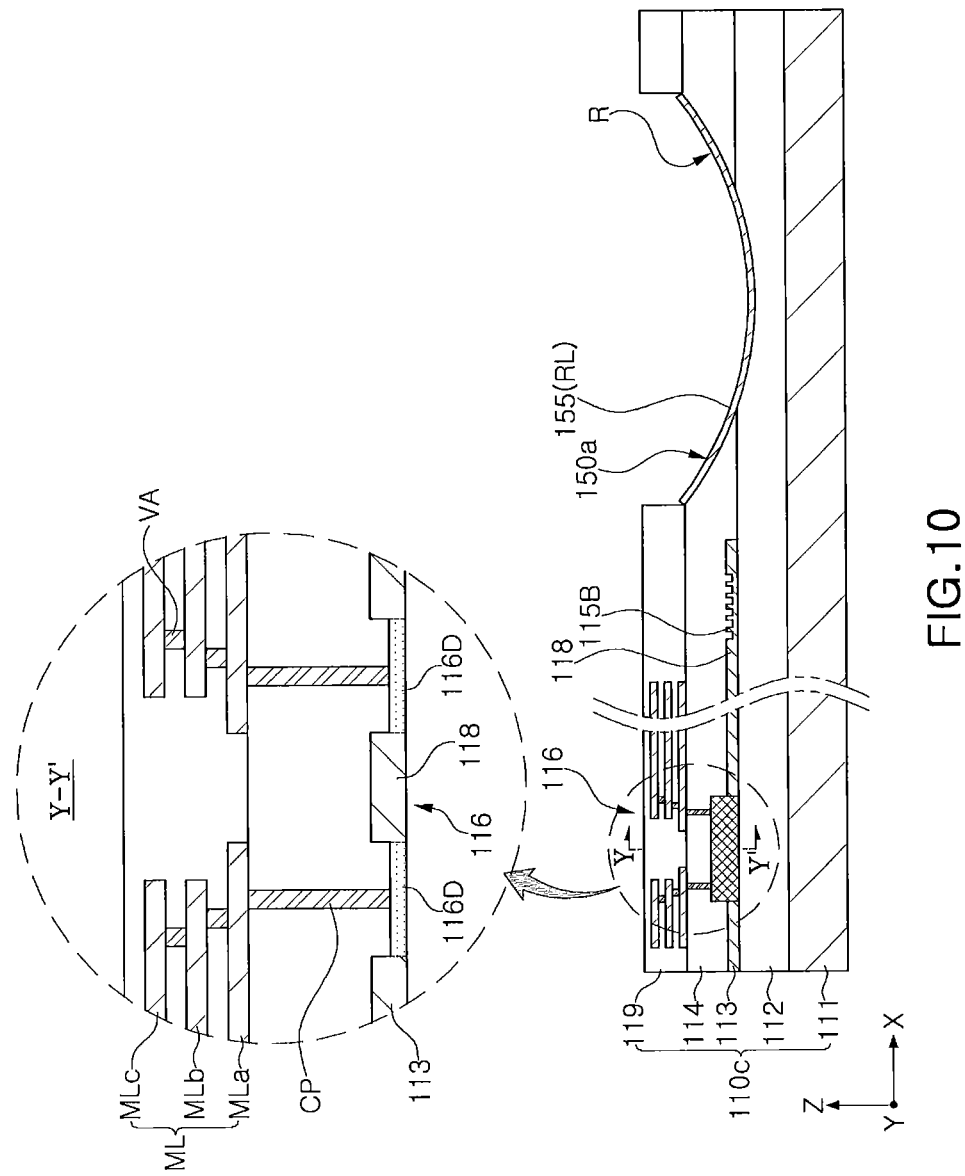

FIG. 10 illustrates that a photonic modulator 116, a second grating coupler 115B, a photonic waveguide 118 and a reflective unit 150a may be provided in a photonic integrated circuit substrate 110c. The photonic modulator 116 may have the same structure as described above with reference to FIG. 9, while a plurality of first to third wiring layers MLa, MLb and MLc may be above the photonic modulator 116 on different levels. A lower first wiring layer MLa may be on contact plugs CP, and may be connected to an upper second wiring layer MLb by a via plug VA. The second wiring layer MLb and a third wiring layer MLc may also be connected by a via plug VA.

At least a portion of a metal layer 155 as a reflective layer RL, constituting the reflective unit 150a, may be located at the same height as at least one of the wiring layers ML. For example, a height of the metal layer 155 in an edge region may be substantially the same or similar to the first wiring layer MLa. Alternatively, the height of the metal layer 155 in the edge region may be substantially the same as or similar to the second wiring layer MLb or the third wiring layer MLc. According to some examples of embodiments, at least a portion of the metal layer 155 may have the same thickness as that of at least one of the wiring layers ML. Such a structure may be obtained by forming one of the wiring layers ML and the metal layer 155 together, in the same process.

Figure 11:
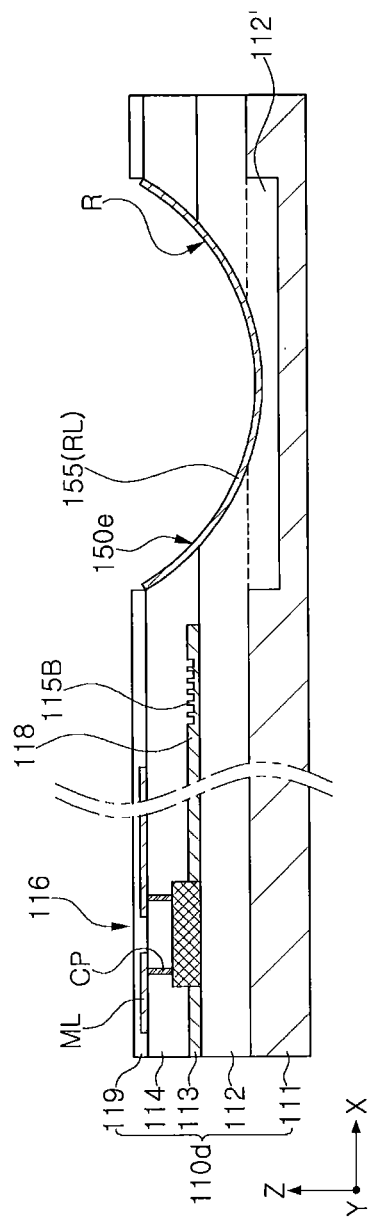

FIG. 11 illustrates that a light modulator 116, a second grating coupler 115B, a photonic waveguide 118, and a reflective unit 150e may be provided in a photonic integrated circuit substrate 110d. At least a portion of a metal layer 155 as a reflective layer RL, constituting the reflective unit 150e, may be located on the same level as that of wiring layers ML. The photonic integrated circuit substrate 110d may further include an insulating region 112' extending from a first insulating layer 112 into the base substrate 111.

The insulating region 112' may be located in a region corresponding to a central portion of the reflective unit 150e, and may be formed by forming a cavity in a base substrate 111 and filling the cavity with an insulating material. The reflective unit 150e may be located in a recessed region R that extends through or into a second insulating layer 114, a first insulating layer 112, and the insulating region 112' from above.

In some examples of embodiments, for example, when the wiring layers ML are at a relatively low height and thus it is desired that the reflective unit 150e in the recessed region R is recessed into a lower portion of the first insulating layer 112, the reflective unit 150e may be formed after the insulating region 112' is formed in the base substrate 111.

Figure 12:
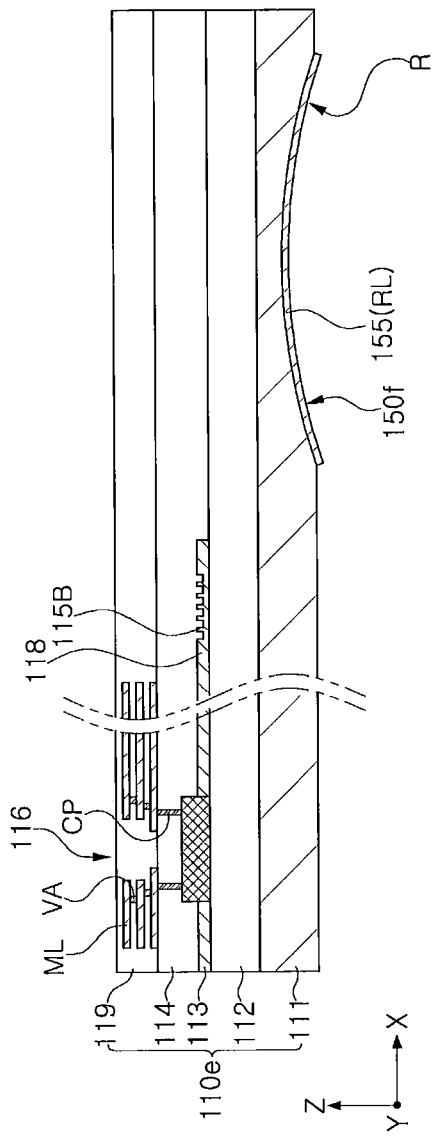

FIG. 12 illustrates that a light modulator 116, a second grating coupler 115B, a photonic waveguide 118, and a reflective unit 150f may be provided in a photonic integrated circuit substrate 110e. The reflective unit 150f may be located on a rear or lower surface of the photonic integrated circuit substrate 110e. In detail, the reflective unit 150f may be on a first surface of the base substrate 111 that is opposite from a second surface on which a photonic core layer 113 provided with photonic devices located therein is positioned. The reflective unit 150f may be located in a recessed region R formed by recessing the base substrate 111. In some examples of embodiments, the reflective unit 150f may also be spaced apart laterally from a photonic coupling device such as the second grating coupler 115B.

In some examples of embodiments, a photonic signal may be transmitted and received by passing through the base substrate 111 among a separate photonic structure below the photonic integrated circuit substrate 110e, the second grating coupler 115B and the reflective unit 150f. According to some examples of embodiments, an anti-reflective layer may also be in a region of the base substrate 111 in which the photonic signal or light passes through the base substrate 111.

Figure 13:
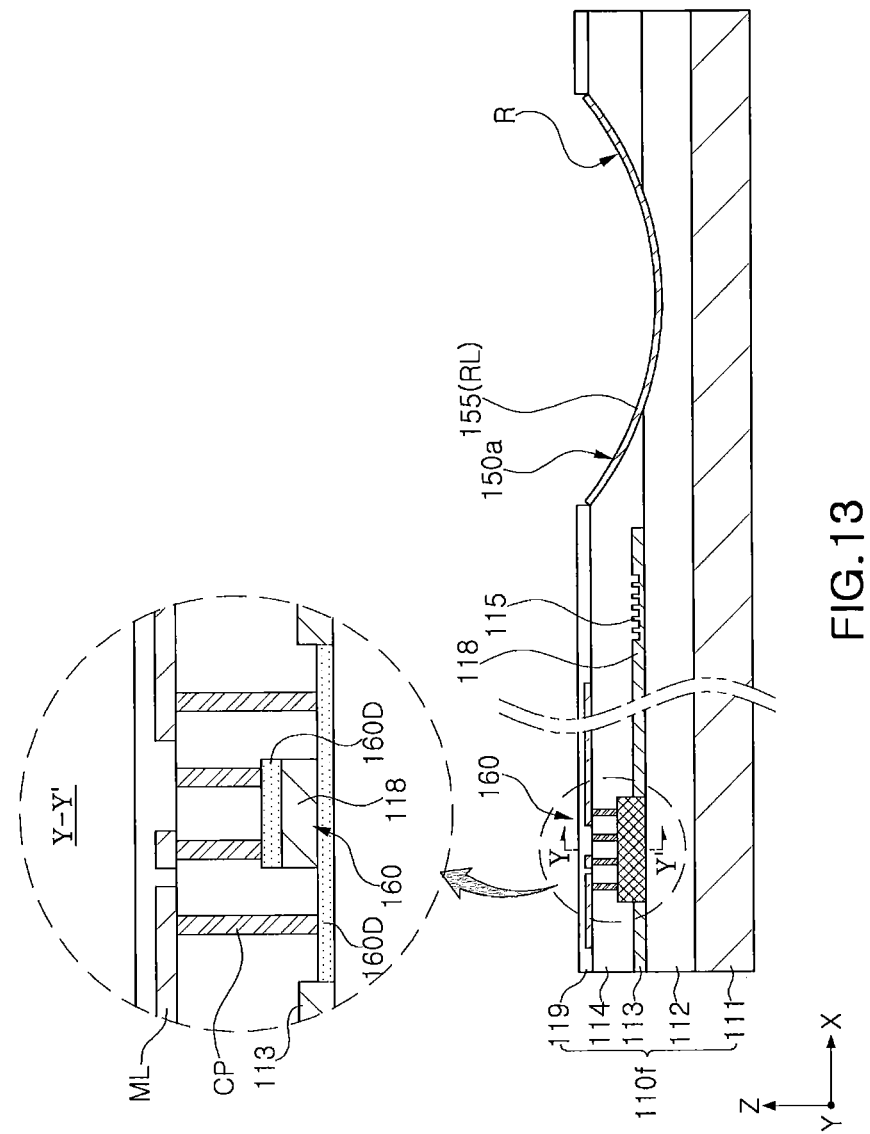
FIGS. 13 and 14 are cross-sectional views illustrating portions of a photonic integrated circuit package according to some examples of embodiments.
Figure 14:
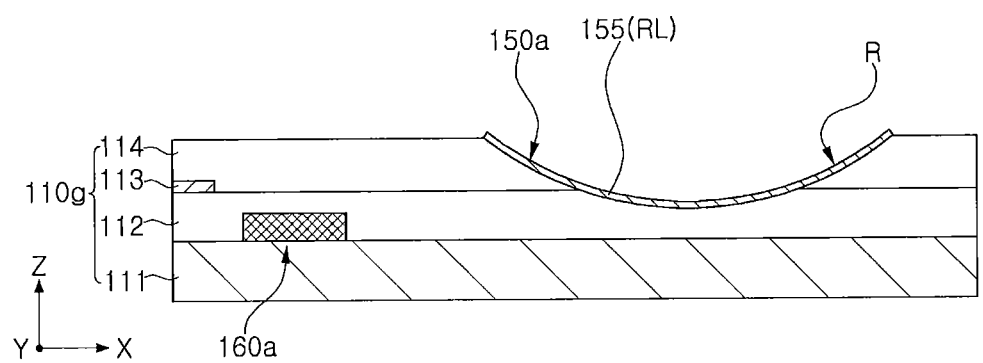

FIGS. 13 and 14 are cross-sectional views of portions of a photonic integrated circuit package according to some examples of embodiments.

FIG. 13 illustrates that a photodetector 160, a grating coupler 115, a photonic waveguide 118 and a reflective unit 150a may be provided in a photonic integrated circuit substrate 110f. The photodetector 160 may be laterally spaced apart from the reflective unit 150a.

As illustrated in an enlarged view taken along line Y-Y' in FIG. 13, the photodetector 160 may include two impurity regions 160D having different conductivities, in a photonic core layer 113 and positioned on upper and lower portions of the photonic waveguide 118 or of a region extending therefrom in which the photonic signal is transmitted. The photonic integrated circuit substrate 110f may further include contact plugs CP on the impurity regions 160D to be connected thereto, and wiring layers ML on the contact plugs CP.

At least a portion of a metal layer 155 as a reflective layer RL, constituting the reflective unit 150a, may be located on the same level as the wiring layers ML. For example, a height of an edge portion of the metal layer 155, as measured from an upper surface of the base substrate 111, may be substantially the same as or similar to that of the wiring layers ML. According to some examples of embodiments, at least a portion of the metal layer 155 may have the same thickness as that of the wiring layers ML, the structure of which may be obtained as the wiring layers ML and the metal layer 155 are formed in the same process.

FIG. 14 illustrates that a photodetector 160a and a reflective unit 150a may be provided in a photonic integrated circuit substrate 110g. The photodetector 160a may be located on a base substrate 111 rather than in a photonic core layer 113, in a manner different from the example embodiment illustrated in FIG. 13. In some examples of embodiments, the photodetector 160a may also be spaced apart from the reflective unit 150a.

The photodetector 160a may receive a photonic signal that is reflected upwardly from the reflective unit 150a and then re-transmitted from above, directly without through a grating coupler 115.

FIGS. 15A to 15E are views illustrating a method of manufacturing a photonic integrated circuit package according to some examples of embodiments. FIGS. 15A to 15E illustrate principal processes in a method of manufacturing a photonic integrated circuit package including the photonic integrated circuit substrate 110b of FIG. 9.

Figure 15A:
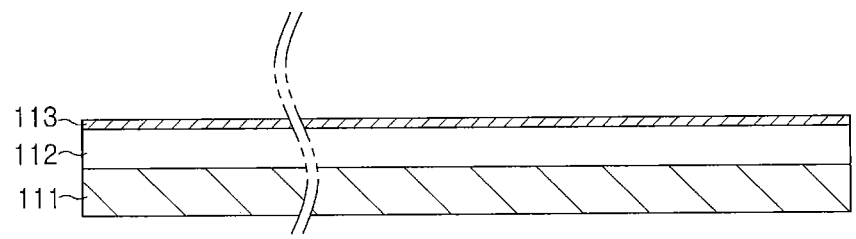
FIGS. 15A to 15E are views illustrating a method of manufacturing a photonic integrated circuit package according to some examples of embodiments.

Referring to FIG. 15A, a stacked structure in which a base substrate 111, a first insulating layer 112, and a photonic core layer 113 including a semiconductor material are stacked sequentially may be prepared. The stacked structure may be prepared using an SOI substrate.

Figure 15B:
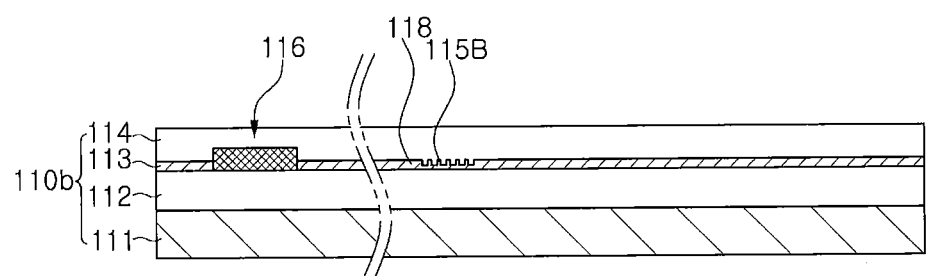

Referring to FIG. 15B, photonic devices, such as a photonic modulator 116, a photonic waveguide 118 and a second grating coupler 115B, may be formed in the photonic core layer 113, and a second insulating layer 114 may be formed on the photonic core layer 113.

Thus, the photonic integrated circuit substrate 110b that includes the base substrate 111, the first insulating layer 112, the photonic core layer 113 in which the photonic devices are located, and the second insulating layer 114 may be manufactured.

In this operation, in addition to the photonic modulator 116, the photonic waveguide 118 and the second grating coupler 115B, various photonic devices such as a photodetector, a wavelength division multiplexer, or the like, may be formed in the photonic core layer 113. The photonic devices may be formed by performing semiconductor processes such as a photolithography process, an ion implantation process, an etching process, a deposition process, or the like.

For example, in examples of embodiments in which a reflective unit 150a extends downwardly to a lower portion of the second insulating layer 114 in a manner similar to that of FIG. 5, in this operation, a portion of the photonic core layer 113 may first be removed from a region in which the reflective unit 150a is to be formed, and then, the second insulating layer 114 may be formed.

Figure 15C:
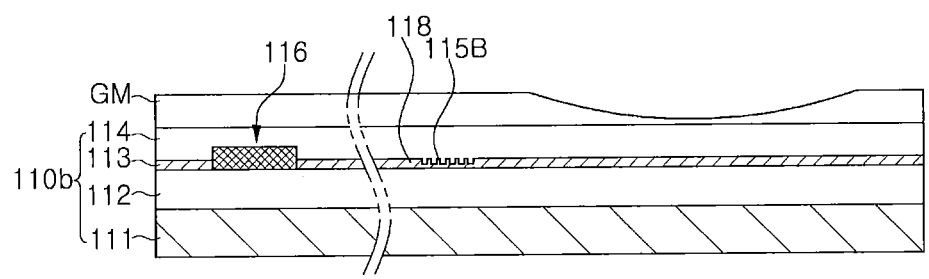

Referring to FIG. 15C, a mask layer GM for an etching process may be formed on the photonic integrated circuit substrate 110b.

In a region in which a recessed region R is to be formed, the second insulating layer 114 may have a flat upper surface. If the second insulating layer 114 is not flat in the region in which the recessed region R is to be formed, a planarization process may be further performed before formation of the mask layer GM.

As illustrated in FIG. 15C, the mask layer GM may be a photoresist layer, and may be formed as a three-dimensional pattern layer having a concave form, in a region in which the recessed region R is to be formed, by performing a photolithography process using a grayscale photonic mask. However, the form of the mask layer GM to form the recessed region R is not limited thereto. For example, a form of the mask layer to expose a region, in which the recessed region R is to be formed, may also be applied thereto, depending on the type of a subsequent etching process.

Figure 15D:
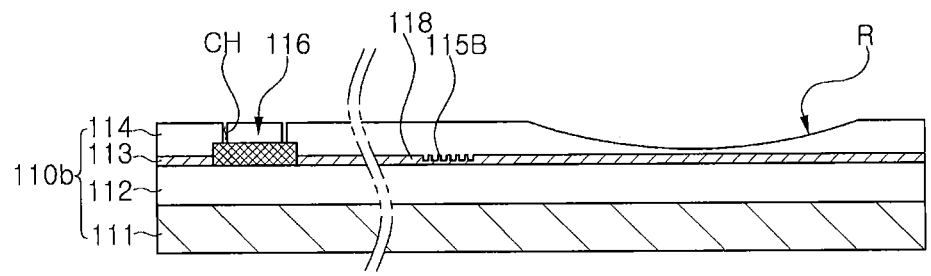

Referring to FIG. 15D, the second insulating layer 114 may be partially removed to form the recessed region R having a concave shape.

The recessed region R may be a region corresponding to a concave mirror in which the reflective unit 150 is formed in a subsequent process. The recessed region R may be formed to have a shape in which the shape of the mask layer GM is transferred, by performing an etching process on the mask layer GM and the second insulating layer 114 of FIG. 15C.

On the photonic modulator 116, contact holes CH for formation of contact plugs CP may be formed by partially removing the second insulating layer 114. According to some examples of embodiments, an etching process for the formation of the contact holes CH and the etching process for the formation of the recessed region R may be performed together at least in part.

In some examples of embodiments, for example, where the recessed region R is formed using a mask layer having a form exposing a region in which the recessed region R is to be formed, rather than using a grayscale mask layer, a wet etching process or the like may be performed to form an undercut region below the mask layer, thereby forming the recessed region R having a concave form.

Figure 15E:
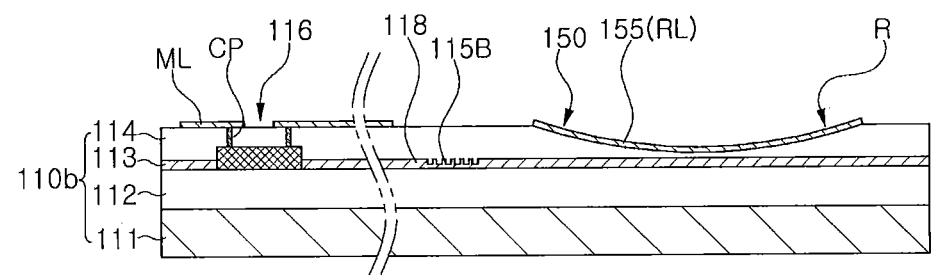

Referring to FIG. 15E, wiring layers ML electrically connected to the photonic modulator 116 and a reflective layer RL may be formed.

First, the contact plugs CP may be formed by filling the contact holes CH with a conductive material on the photonic modulator 116.

Next, the wiring layers ML and the reflective layer RL may be formed by depositing a metal on an upper surface of the second insulating layer 114 and patterning the deposited metal. For example, the wiring layers ML connected to the photonic devices such as the photonic modulator 116, and a metal layer 155 forming the reflective unit 150, may be formed together in a single process. In some examples of embodiments, at least one of the deposition process of a metal and the patterning process may be performed as a single process. Depending on a range of the metal removed in the patterning process, metal layers such as the metal layers 155a and 155b of the some examples of embodiments of FIGS. 7 and 8 may be formed.

The alignment mark 170 (see FIG. 2) may also be formed on an upper surface of the second insulating layer 114, using, for example, a patterning process for the formation of the wiring layers ML and/or the reflective layer RL.

Figure 16:
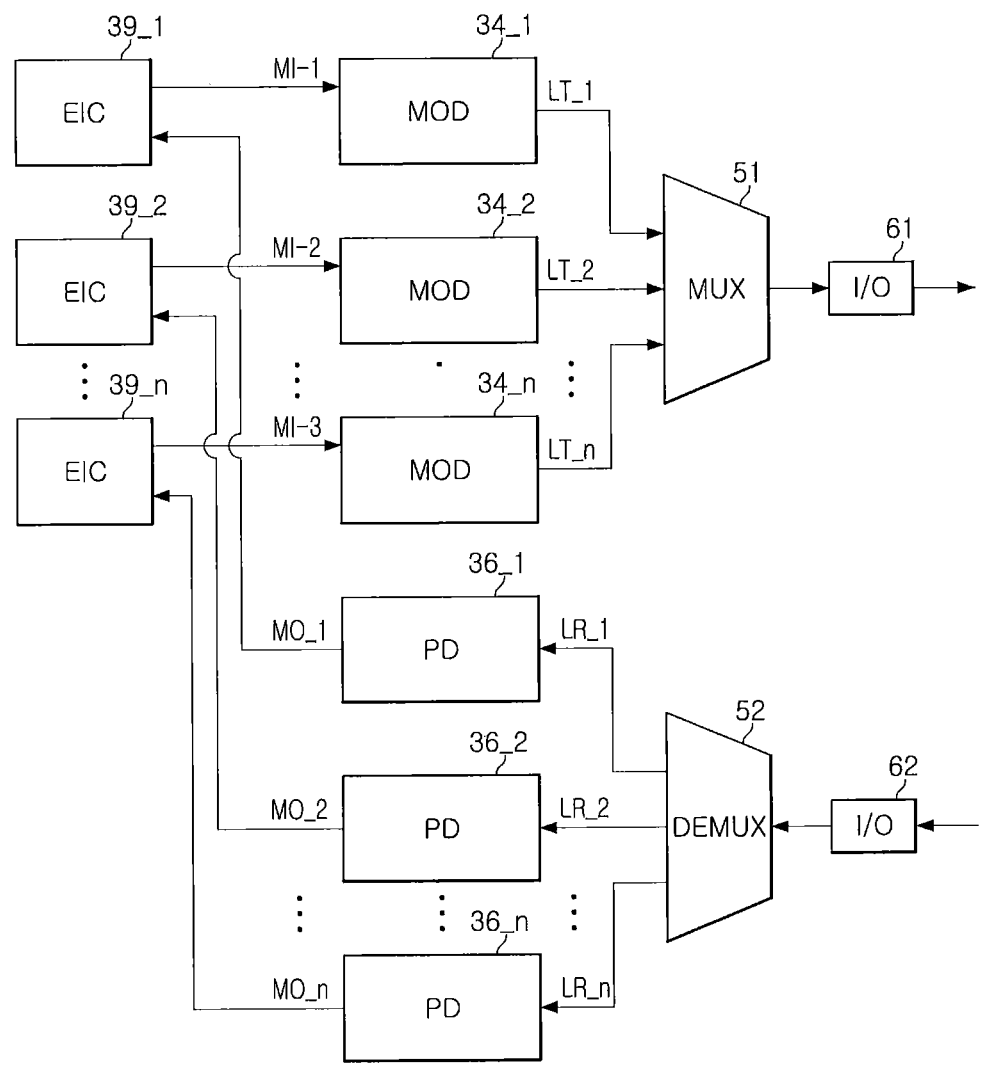
FIG. 16 is a diagram illustrating a photonic integrated circuit system including a photonic integrated circuit package according to some examples of embodiments.

FIG. 16 is a diagram illustrating a photonic integrated circuit system including a photonic integrated circuit package according to some examples of embodiments.

Referring to FIG. 16, a photonic integrated circuit system 10A may include the photonic integrated circuit package or the photonic integrated circuit substrate, described above with reference to FIGS. 2 to 14. The photonic integrated circuit system 10A may include a plurality of electrical integrated circuit devices 39_1 to 39_$n$, a plurality of photonic modulators 34_1 to 34_$n$, a plurality of optical-electric conversion devices 36_1 to 36_$n$, alignment devices 51 and 52, and receptacle connectors 61 and 62. In the photonic integrated circuit system 10A, an electric-optical conversion device is not illustrated for convenience of description.

The alignment devices 51 and 52 may include a photonic signal multiplexer 51 and a photonic signal demultiplexer 52. The plurality of photonic modulators 34_1 to 34_$n$ may generate photonic transmission signals LT_1 to LT_n having been modulated, based on electrical transmission signals MI_1 to MI_n received from the plurality of electrical integrated circuit devices 39_1 to 39_$n$, respectively. At this time, the modulated photonic transmission signals LT_1 to LT_n may respectively be photonic signals having different wavelengths.

The photonic signal multiplexer 51 included in the alignment devices 51 and 52 may generate a photonic signal multiplexed using the modulated photonic transmission signals LT_1 to LT_n, and may output the multiplexed photonic signal to an external device or a package circuit substrate via the receptacle connectors 61 and 62.

The multiplexed photonic signal may be transmitted from the external device via the receptacle connectors 61 and 62, and may be provided to the photonic signal demultiplexer 52 included in the alignment devices 51 and 52. The photonic signal demultiplexer 52 may demultiplex the multiplexed photonic signals received from the receptacle connectors 61 and 62 into the modulated photonic reception signals LR_1 to LR_n. At this time, the modulated photonic reception signals LR_1 to LR_n may respectively be photonic signals having different wavelengths.

The plurality of optical-electric conversion devices 36_1 to 36_$n$ may generate modulated electrical reception signals MO_1 to MO_n based on the modulated photonic reception signals LR_1 to LR_n, respectively, and may provide the modulated electrical reception signals MO_1 to MO_n to a plurality of electrical integrated circuit devices 39_1 to 39_$n$.

Figure 17:
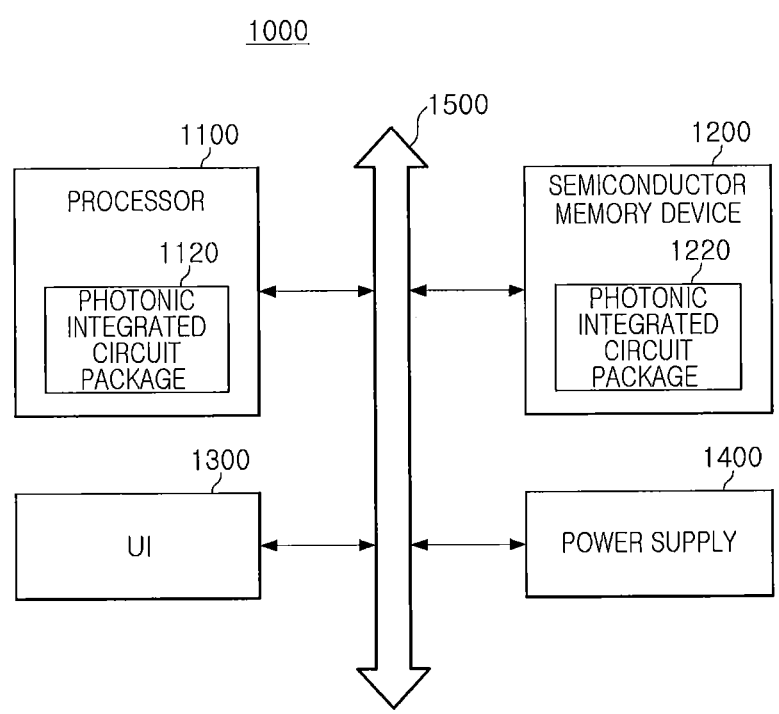
FIG. 17 is a block diagram of a computer system including a photonic integrated circuit package according to some examples of embodiments.

FIG. 17 is a block diagram of a computer system including a photonic integrated circuit package according to some examples of embodiments of the inventive concepts provided herein.

Referring to FIG. 17, a computer system 1000 may include a signal processing system, a display system, a communications system, and/or a system through which a signal may be transmitted photonically. The computer system 1000 may include a processor 1100, a semiconductor memory device 1200, a user interface 1300, a power supply 1400, and a photonic bus 1500.

The processor 1100 may communicate with other elements using the photonic bus 1500. The processor 1100 may include the photonic integrated circuit package (1120) or the photonic integrated circuit substrate described above with reference to FIGS. 2 to 14.

The semiconductor memory device 1200 may be coupled to the photonic bus 1500. The semiconductor memory device 1200 may include the photonic integrated circuit package (1220) or the photonic integrated circuit substrate described above with reference to FIGS. 2 to 14. Thus, the semiconductor memory device 1200 may communicate with other elements via the photonic bus 1500.

The power supply 1400 may communicate with other elements by the photonic bus 1500.

The user interface 1300 may provide input/output to and from a user.

As set forth herein, according to examples of embodiments of the inventive concepts, by efficiently disposing a photonic coupling device and a reflective unit in a photonic integrated circuit substrate, a photonic integrated circuit package having improved integration may be provided.

A method of manufacturing a photonic integrated circuit package may be performed by combining a fabrication process of photonic devices and a fabrication process of a reflective unit, thereby exhibiting improved manufacturing efficiency.

While examples of embodiments have been shown and described herein, it will be apparent to those skilled in the art that modifications and variations could be made without departing from the scope of the present disclosure as defined by the appended claims.

What is claimed is:

1. A photonic integrated circuit package comprising:
   a substrate;
   a first insulating layer on the substrate;
   a photonic core layer on the first insulating layer;
   a photonic coupling device in the photonic core layer, wherein the photonic coupling device comprises at least one of a grating coupler or a photodetector;
   a second insulating layer on the photonic core layer, the second insulating layer having a first surface and a second surface opposite to the first surface; and
   a concave mirror on the first surface of the second insulating layer and recessed into at least the second insulating layer toward the substrate on the second surface of the second insulating layer.

2. The photonic integrated circuit package of claim 1, wherein the concave mirror is spaced apart from the photonic coupling device.

3. The photonic integrated circuit package of claim 1, wherein the concave mirror extends through the second insulating layer and into at least a portion of the first insulating layer.

4. The photonic integrated circuit package of claim 1, wherein the photonic core layer partially overlaps the concave mirror in a vertical direction.

5. The photonic integrated circuit package of claim 1, wherein a central portion of the concave mirror is located on a same vertical level as or a higher vertical level than an upper surface of the substrate.

6. The photonic integrated circuit package of claim 1, wherein the concave mirror comprises a reflective layer on a surface of the concave mirror.

7. The photonic integrated circuit package of claim 6, wherein the reflective layer comprises a metal layer.

8. The photonic integrated circuit package of claim 7, further comprising at least one wiring layer electrically connected to the photonic coupling device,
   wherein at least a portion of the reflective layer is located on the same vertical level as a level of the at least one wiring layer.

9. The photonic integrated circuit package of claim 7, wherein the reflective layer further comprises a dielectric layer on the metal layer.

10. The photonic integrated circuit package of claim 6, wherein the reflective layer comprises first and second Bragg layers alternately stacked and having different refractive indices.

11. The photonic integrated circuit package of claim 6, wherein the reflective layer extends beyond an outer edge of the concave mirror, and wherein the reflective layer extends in a plane that is parallel to an upper surface of the second insulating layer.

12. The photonic integrated circuit package of claim 1, wherein the concave mirror has steps having a stepped shape on a surface of the concave mirror.

13. The photonic integrated circuit package of claim 1, further including an insulating region extending into a recess in the substrate from a lower surface of the first insulating layer, wherein the concave mirror extends into the insulating region.

14. The photonic integrated circuit package of claim 13, further comprising an electric-optical conversion device on the second insulating layer, wherein the electric-optical conversion device is configured to generate a photonic signal, wherein the photonic core layer comprises a photonic waveguide configured to pass the photonic signal to the photonic coupling device, wherein the photonic coupling device is configured to provide the photonic signal toward an upper portion of the second insulating layer, wherein the upper portion of the second insulating layer is configured to direct the photonic signal toward the concave mirror, and wherein the concave mirror is configured to direct the photonic signal toward the upper portion of the second insulating layer.

15. The photonic integrated circuit package of claim 1, further comprising an electrical integrated circuit device on the second insulating layer.

16. A photonic integrated circuit package comprising:
    a photonic integrated circuit substrate including an insulating layer and a photonic core layer;
    at least one grating coupler or photodetector in the photonic core layer; and
    a concave mirror recessed into a portion of the photonic integrated circuit substrate from one surface of the photonic integrated circuit substrate, and spaced apart laterally from the at least one grating coupler or photodetector,
    wherein an outer circumference of the concave mirror is on the one surface of the photonic integrated circuit substrate and a recessed lower end of the concave mirror is within the insulating layer.

17. The photonic integrated circuit package of claim 16, wherein the insulating layer is above the photonic core layer, and wherein the concave mirror does not extend into the photonic core layer of the photonic integrated circuit substrate.

18. The photonic integrated circuit package of claim 16, wherein the one surface of the photonic integrated circuit substrate is opposite to a surface of the photonic integrated circuit substrate on which the photonic core layer is positioned.

19. A photonic integrated circuit package comprising:
   a photonic integrated circuit substrate including a base substrate, a first insulating layer, a photonic core layer, and a second insulating layer, stacked sequentially;
   a photonic coupling device in the photonic core layer;
   an electric-optical conversion device on the photonic integrated circuit substrate; and
   a concave mirror recessed into at least the second insulating layer from an upper surface of the photonic integrated circuit substrate toward the base.

* * * * *